United States Patent [19]
Evans

[11] 3,984,283
[45] Oct. 5, 1976

[54] REACTOR
[75] Inventor: Robert M. Evans, Kennett Square, Pa.
[73] Assignee: The United States of America as represented by the United States Energy Research and Development Administration, Washington, D.C.
[22] Filed: Feb. 21, 1946
[21] Appl. No.: 649,407

[52] U.S. Cl. .................................. 176/64; 176/43
[51] Int. Cl.² ...................................... G21C 15/04
[58] Field of Search ............. 204/154.2; 176/64, 43

[56] References Cited
UNITED STATES PATENTS

| | | | |
|---|---|---|---|
| 1,015,831 | 1/1912 | Pielock et al. ........................ | 138/38 |
| 1,318,210 | 10/1919 | Boiteaux ............................. | 138/38 |
| 1,429,149 | 9/1922 | Lawrence ............................ | 257/236 |
| 1,465,118 | 8/1923 | Diescher ............................. | 138/38 |
| 1,469,531 | 10/1923 | Powel ................................ | 138/38 |

FOREIGN PATENTS OR APPLICATIONS

| | | | |
|---|---|---|---|
| 114,150 | 5/1940 | Australia ........................... | 204/154.2 |
| 233,011 | 10/1944 | Switzerland ......................... | 204/154.2 |
| 861,390 | 10/1940 | France .............................. | 204/154.2 |

OTHER PUBLICATIONS
Swain, "Uranium 235-Power Fuel of Future," Power, pp. 56–59, July (1940).
Smyth, "Atomic Energy for Military Purposes," pp. 75, 103, 104, 83, 84 Aug. 1945.
Water Tube Boilers by Leslie Robertson, pub. by John Murray, London, 1901, pp. 159–161.
Elements of Chemical Engineering by W. L. Badger and W. L. McCabe, Second Ed., McGraw Hill Book Co., N.Y. 1936, pp. 77–79.

*Primary Examiner*—Harvey E. Behrend
*Attorney, Agent, or Firm*—Dean E. Carlson; Arthur A. Churm

EXEMPLARY CLAIM

1. A neutronic reactor having a moderator, coolant tubes traversing the moderator from an inlet end to an outlet end, bodies of material fissionable by neutrons of thermal energy disposed within the coolant tubes, and means for circulating water through said coolant tubes characterized by the improved construction wherein the coolant tubes are constructed of aluminum having an outer diameter of 1.729 inches and a wall thickness of 0.059 inch, and the means for circulating a liquid coolant through the tubes includes a source of water at a pressure of approximately 350 pounds per square inch connected to the inlet end of the tubes, and said construction including a pressure reducing orifice disposed at the inlet ends of the tubes reducing the pressure of the water by approximately 150 pounds per square inch.

1 Claim, 16 Drawing Figures

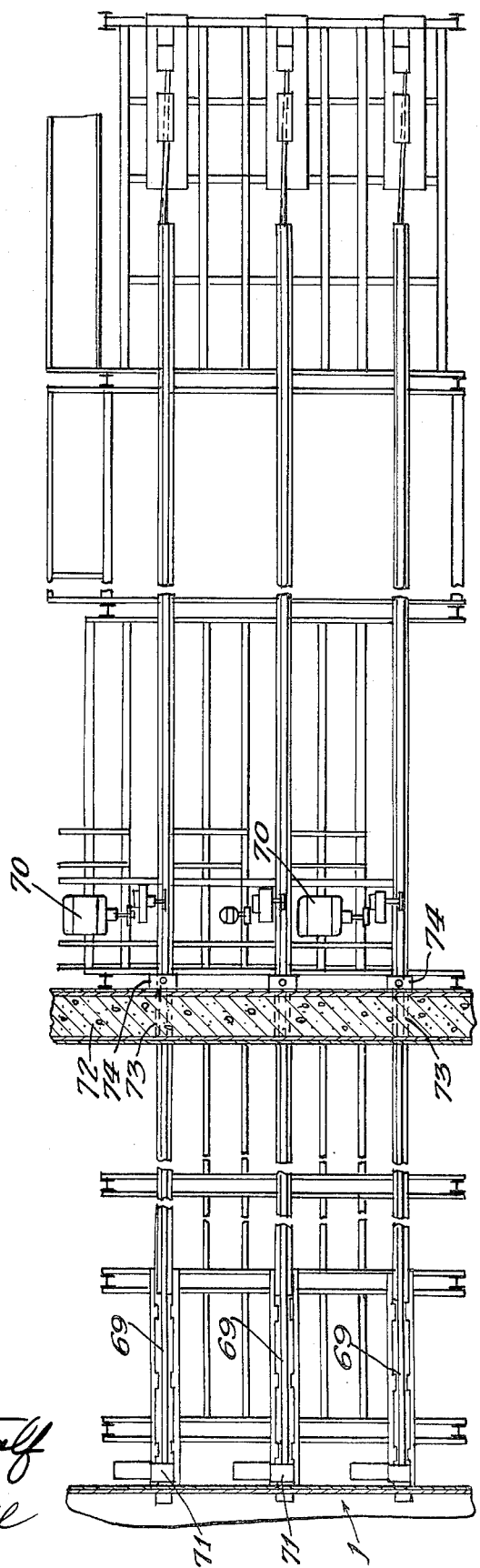

REACTOR

The present invention relates to nuclear physics and more particularly to high power liquid cooled atomic power plants, known as neutronic reactors.

In certain forms of neutronic reactors, power in the form of heat is generated by a self-sustaining chain fission reaction, wherein a uranium isotope is fissioned by capture of slow or thermal neutrons.

In a self-sustaining chain reaction of uranium with slow neutrons, as presently understood, $92^{238}$ is converted by neutron capture to the isotope $92^{239}$. The latter is converted by beta decay to $94^{239}$. Other isotopes of 93 and 94 may be formed in small quantities. By slow or thermal neutron capture, $92^{235}$ on the other hand, can undergo nuclear fission to release energy appearing as heat, gamma and beta radiation, together with the formation of fission fragments appearing as radioactive isotopes of elements of lower mass numbers, and with the release of secondary neutrons.

The secondary neutrons thus produced by the fissioning of the $92^{235}$ nuclei have a high average energy, and must be slowed down to thermal energies in order to be in the optimum condition to cause flow neutron fission in other $92^{235}$ nuclei. This slowing down, or moderation, of the neutron energy, is accomplished by passing the neutrons through a material where the neutrons are slowed by collision. Such a material is known as a moderator. While some of the secondary neutrons are absorbed by the uranium isotope $92^{238}$ leading to the production of element 94, and by other materials such as the moderator, enough neutrons can remain to sustain the chain reaction, when proper conditions are maintained.

Under these proper conditions, the chain reaction will supply not only the neutrons necessary for maintaining the neutronic reaction but also will supply the neutrons for capture by the isotope $92^{238}$ leading to the production of 94, and excess neutrons for use as desired. The basic principles of neutronic reactors using natural uranium have been set forth in detail in the co-pending Fermi and Szilard application, Ser. No. 568,904, filed Dec. 19, 1944 now U.S. Pat. No. 2,708,656 dated May 15, 1955.

As 94 is a transuranic element, it can be separated from the unconverted uranium by chemical methods and, as it is fissionable by slow neutrons in a manner similar to the uranium isotope $92^{235}$, $94^{239}$ is valuable, for example, for enriching natural uranium for use in other chain reacting systems of smaller overall size. The fission fragments are also valuable as sources of radioactivity.

In a chain fission reaction, the ratio of the fast neutrons produced in one generation by the fissions to the original number of fast neutrons in a reactive mass of infinite size where there can be no external loss of neutrons is called the multiplication factor of the system, and is denoted by the symbol K. For any finite mass, some neutrons will escape from the periphery. Consequently, a reactive mass of finite size may be said to have K constant, even though the value thereof would only exist if the mass as built were extended to infinity without change of geometry or materials. Thus, when K is referred to herein as a constant of a reactive composition of practical size, it always refers to the reproduction ratio that would exist in the same reactive composition of infinite size.

The K factor of a reactive composition depends on the mode of disposition of the uranium or other thermally fissionable material in the moderator, on the amount of residual neutron absorbing impurities in the uranium and moderator, and upon the amount of neutron absorption in deliberately inserted impurities such as, for example, in the case of liquid cooled reactors, on the neutron absorption in the coolant tubes, coolant, and protective coatings placed around the uranium to prevent corrosion thereof. Once the K factor is known, then the proper finite operating size of the reactor can be determined. The reproduction ratio r for a finite reactor differs from the K factor by the neutron leakage factor and a factor representing the neutron absorption by impurities introduced for particular reasons into the reactor. As the K factor is the neutron reproduction ratio in a reactive mass of infinite size where there can be no exterior loss of neutrons, the reactive mass can be only reduced in size to the point where the neutron reproduction ratio r in the reduced mass is not less than unity, and still be operative. As the reactor of practical size must have an exterior loss of neutrons there will be, of course, a size known as critical size, where the neutron reproduction ratio is exactly unity. As it is necessary to control the reactor from a condition where no chain reaction exists, to some elevated operating power, the reacting mass is only reduced to a size where the neutron reproduction ratio is somewhat over unity, as for example, 1.002 to 1.005, with neutron absorbing control rods movable into and out of the reactor to change the reproduction ratios from below unity when inserted, to a maximum of 1.002 to 1.005 when entirely removed. Under the latter conditions, the neutron density in the reactor will rise exponentially with time. When the desired operating power is reached, the control rod is inserted to a position where the neutron reproduction ratio is unity, and small rod movements thereafter will stabilize the reactor at a constant power output, other conditions remaining the same.

In liquid cooled neutronic reactors designed for element 94 production, especially when water is used as a coolant, the amount of water that can be present in the reactor at any one time is limited by the neutron absorption of the coolant present, because this absorption reduces the K factor of the reactive composition of which the reactor is built. Thus when, for example, the water is passed through the reactor in coolant tubes which contain cylindrical jacketed uranium bodies or slugs, the water is present as a thin annulus around the jacketed uranium bodies, in which about 94 per cent of the heat originates. Every precaution must be taken to prevent boiling the coolant in the tubes, as a dangerous condition could then be attained.

If, for example, the K factor of the reactor is reduced 0.025 per cent by the water in the coolant tubes, it is clear that at any location in the reactor where the water is turned to steam the K factor will at that point rise because of the greatly reduced atomic density of the steam around the uranium, leading to a greatly reduced local neutron absorption. When this happens, the neutron density can rise locally at that point, due to the increased reproduction ratio, the exposed uranium can become hotter, heat and neutrons may be transferred to nearby tubes, to cause boiling there. This condition results in progressive increases in heat and steam generation and also, due to the progressive removal of the moderating coolant over an increasing area, to an exponential rise in neutron density and resultant acceleration of the chain reaction. This situation, if not checked, could lead to the destruction of the reactor. It has been found that this condition, sometimes called the "boiling disease", can be prevented by proper design and operation of the coolant circulation system, and it is an object of the present invention to prevent the possibility of the start of the "boiling disease" in a liquid cooled neutronic reactor.

It will be understood that the selection of fissionable material and moderator materials, the relative amounts thereof and the critical size of the reactive composition required to produce a self-sustaining chain reaction, are not in themselves the object of the present invention. These criteria are now familiar to persons skilled in the art. The construction of a neutronic reactor with coolant tubes containing the fissionable material is likewise not the subject of the present invention, being disclosed in the above-mentioned Fermi application. The present invention is concerned with the combination with such a reactor of a novel flow system for a liquid coolant which is flown through such coolant tubes to cool the reactor.

Broadly stated, the present invention provides a neutronic reactor having a plurality of coolant tubes containing uranium, with means to force water at high pressure through the coolant tubes and around the uranium bodies. The water is delivered to the reactor in manifolds or headers at a high pressure which is reduced by, for example, more than a hundred pounds per square inch in passing through appropriate reducing orifices just prior to entering each coolant tube. Thus a pressure of more than a hundred pounds per square inch is made automatically available to force any generated steam out of the exit end of a coolant tube as fast as it is formed therein, in spite of the back pressure the steam might create, thereby maintaining a high density of the coolant around the uranium bodies.

The present invention supplies coolant under pressure to the tubes in the reactor with a large excess pressure always automatically available in case steam formation in any tube creates a back pressure. This excess pressure forces steam rapidly out of any tube to prevent any dangerous reduction in coolant density around the uranium.

In addition, various neutron absorbing safety controls are inserted into the reactor to shut down the reactor in case coolant tube back pressure rise. However, as such safety devices take an appreciable time to shut down completely a neutronic reaction, it is a further advantage of the present invention that the automatic action of a properly applied differential pressure will operate to sweep out any generated steam from the coolant tubes during the time shutdown is taking place and thus prevent an uncontrollable neutron density rise.

Other objects and advantages of the present invention will become more apparent from the following description, wherein reference is made to the drawings, in which:

FIG. 16 is an enlarged diagrammatic side elevation of the control rod "hot" room and control rods therein in retracted position relative to the reactor.

Figure 1:
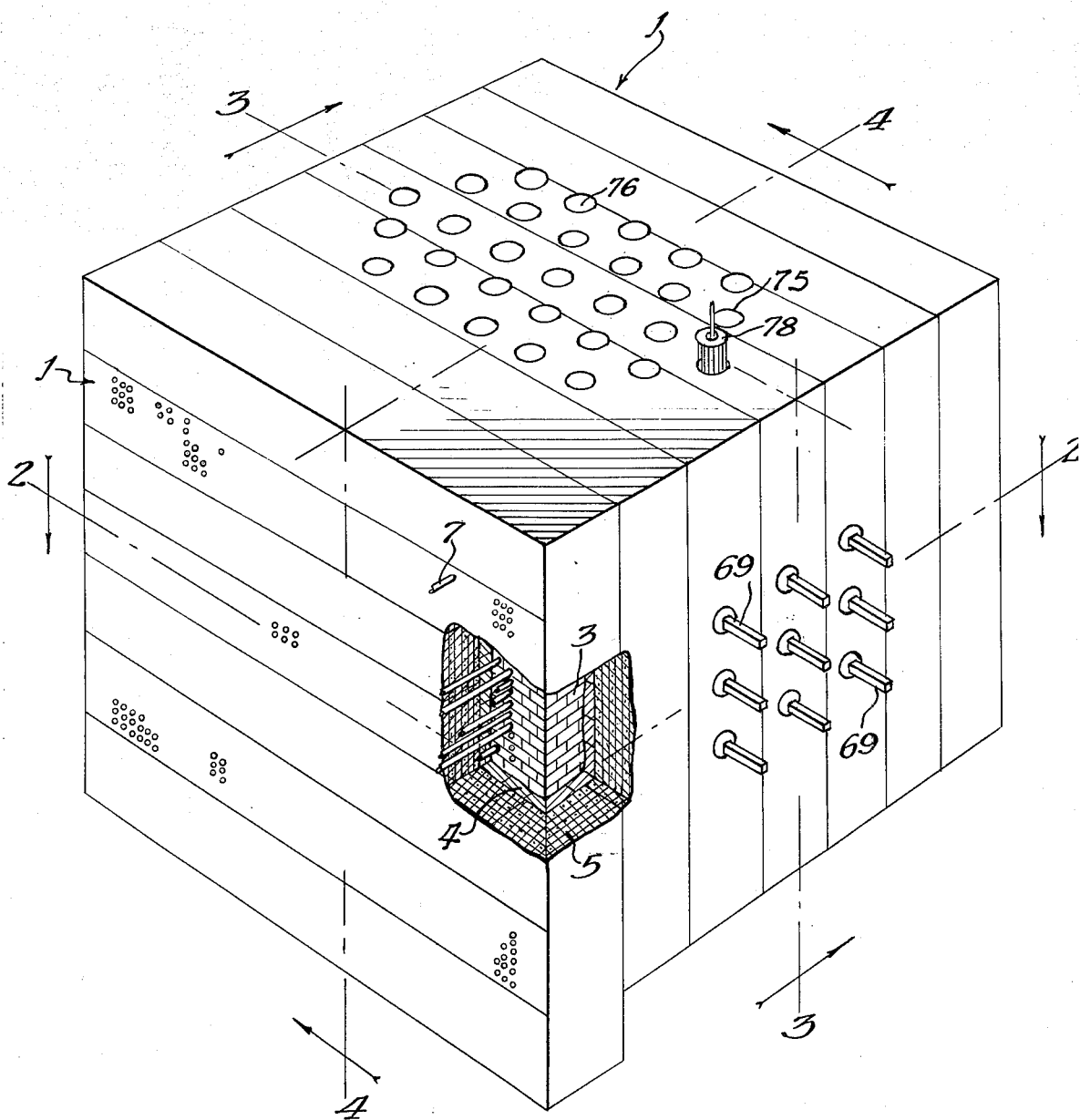
FIG. 1 is a diagrammatic perspective view of a neutronic reactor rated at 250,000 kilowatt output, showing generally the relation of the basic elements thereof and the relations of FIGS. 2 through 4, parts being broken away for clarity.

Referring first to FIGS. 1–4, the reactor proper, indicated at 1, comprises a substantially cubical mass 2 of moderator material, such as high purity and high density graphite, the outer portions on the sides, top and bottom forming a graphite reflector 3, the mass being enclosed on all faces by a thermal shield 4 to absorb thermal neutrons escaping outwardly. The graphite is preferably in the form of elongated blocks of rectangular cross section 4 3/16 inches by a 4 3/16 inches by 48 inches long, which are shaped and fitted together with extreme accuracy and piled accurately in criss-cross layers with staggered joints so as to form as near an approximation as possible to a homogeneous load supporting graphite mass 36 feet by 36 feet by 28 feet. The thermal shield 4 preferably is built up of cast iron blocks. A biological shield 5 encloses the reactor except at the bottom face, and as illustrated in the drawings, is formed of alternate layers of steel sheets and pressed cellulose fibre, such as "Masonite", and serves to stop fast neutrons and gamma radiation.

Certain of the graphite blocks in the moderator mass are provided with bores or passages, as also are certain blocks of the shields, which, when the blocks are properly stacked, form straight and continuous parallel passages 6 which extend fore and aft entirely through the reactor from the charging face to the discharge face and accommodate thin walled aluminum coolant tubes 7, as better illustrated in FIGS. 10 through 13. The coolant tubes 7 are coextensive with the length of the graphite mass and extend through the shielding at the ends of the reactor. The inlet and outlet ends of the coolant tubes 7 are provided with suitable fittings for permitting the insertion and removal of jacketed uranium slugs and for circulating coolant therethrough into contact with the uranium slugs, as is described more fully hereinafter.

Figure 2:
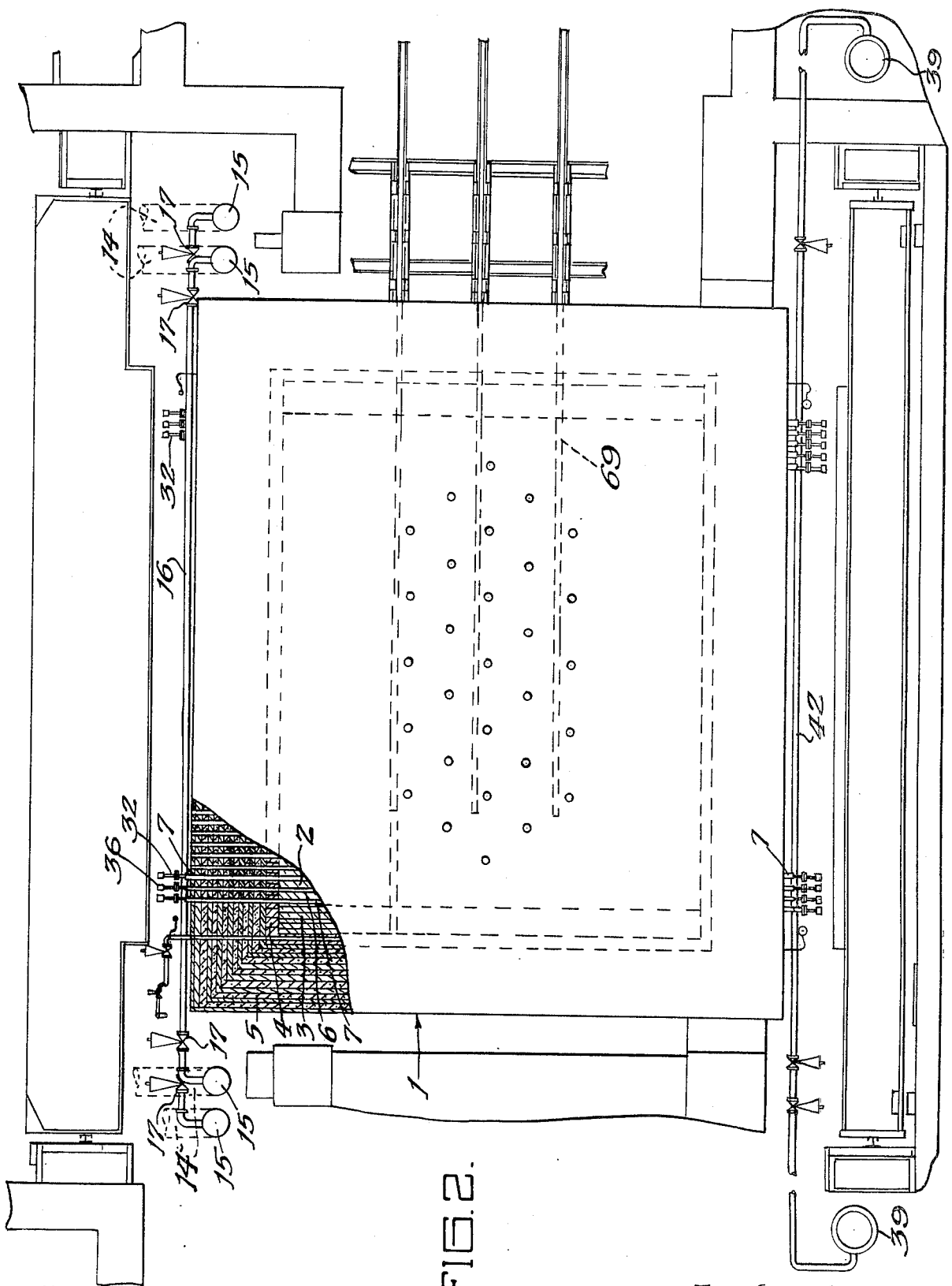
FIG. 2 is a horizontal sectional view of the reactor taken on the plane 2—2 of FIG. 1.
Figure 3:
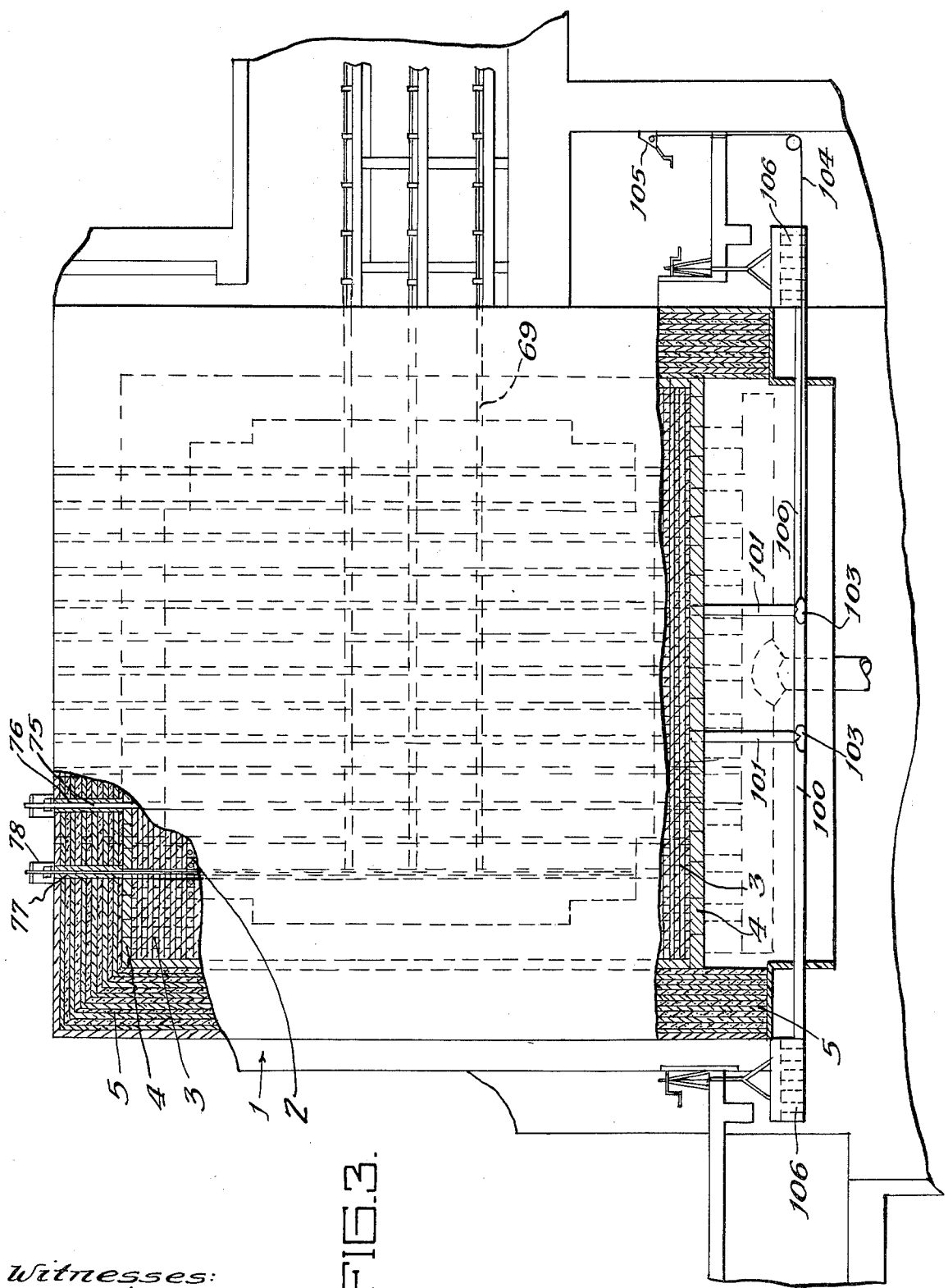
FIG. 3 is a vertical transverse sectional view of the reactor taken on the plane 3—3 of FIG 1.

As stated, the graphite moderator mass is about 26 feet long by 36 feet wide and 36 feet high and contains 2004 aluminum coolant tubes suitable for carrying the uranium slugs. The tubes are spaced 3⅜ inches apart center to center in the moderator mass and arranged in parallel horizontal rows which are spaced apart vertically from each other to form a regular geometric pattern, as illustrated in FIGS. 1 through 3. The outer portion of the moderator mass around the tubes 7 is used as the neutron reflector and is usually about 2 feet thick.

The cooling tubes 7 preferably are of aluminum with an outside diameter of 1.729 inches and a wall thickness of only 0.059 inches. They fit very snugly in the passages 6 with a clearance of only 0.0075 inches, so that the blocks having tube passages must be accurately positioned so as to provide straight and clear passages for the tubes. All 2004 tubes are charged with canned or jacketed uranium slugs in order to render the reaction self-sustaining.

Figure 11:
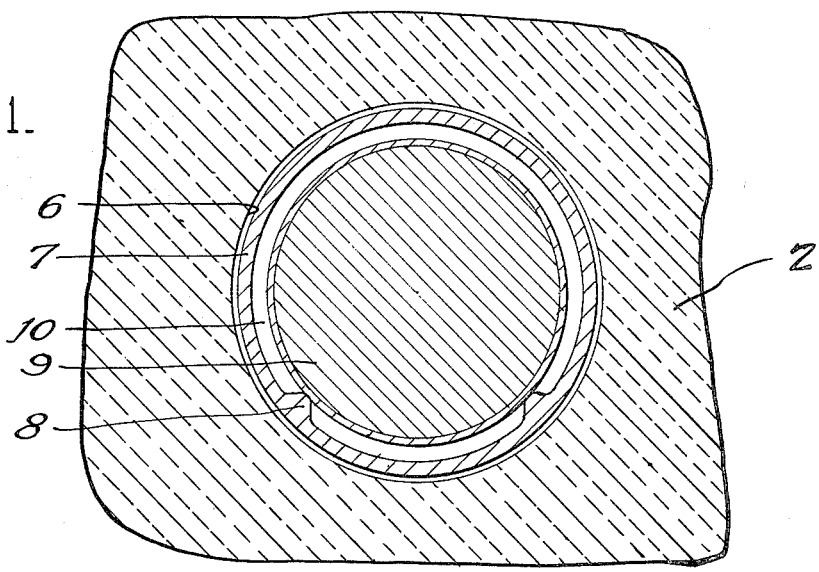
FIG. 11 is an enlarged cross sectional view of one of the coolant tubes and a jacketed metal slug therein, illustrating the manner of supporting the slug in the tube.

In order to cool the reactor during operation and for a critical period after a shutdown when delayed neutron reactions could raise the temperature rapidly, a suitable coolant is circulated under pressure through the tubes 7. In the present embodiment, water is used as a coolant, it being borne in mind, and allowance made for the fact, that water has a known neutron absorbing effect which reduces the K factor of the reactor. As best illustrated in FIG. 11, each coolant tube 7 is provided with internal ribs 8 for centering the slugs 9 of jacketed uranium metal therein so as to form a substantially continuous annular passage 10 for water around the slugs. For a canned slug having an overall diameter of 1.440 inches, the annular water passage is about 0.086 inches in width, and through this annular passage the water is circulated at a velocity of about 19.5 to 20 feet per second.

The inlet of each coolant tube 7 must be accessible for charging. At the same time, each tube must be capable of being separately drained, charged, discharged, removed and replaced without disturbing the other tubes or remainder of the reactor. The heat generated in tubes nearer the center is greater than that generated in more outwardly disposed tubes having the same charge. Consequently, the rate of circulating water in one tube must be capable of variation or selection independently of the rate in other tubes. Due to the large number and relatively close spacing of the tubes, a problem is presented in providing adequate piping while affording ready access to the charging and discharging faces of the reactor. Finally, provision must be made to prevent boiling in the tubes under abnormal conditions.

In order to meet all of these coexisting conditions, the following cooling system is used.

Cooling System at Charging Face

Figure 5:
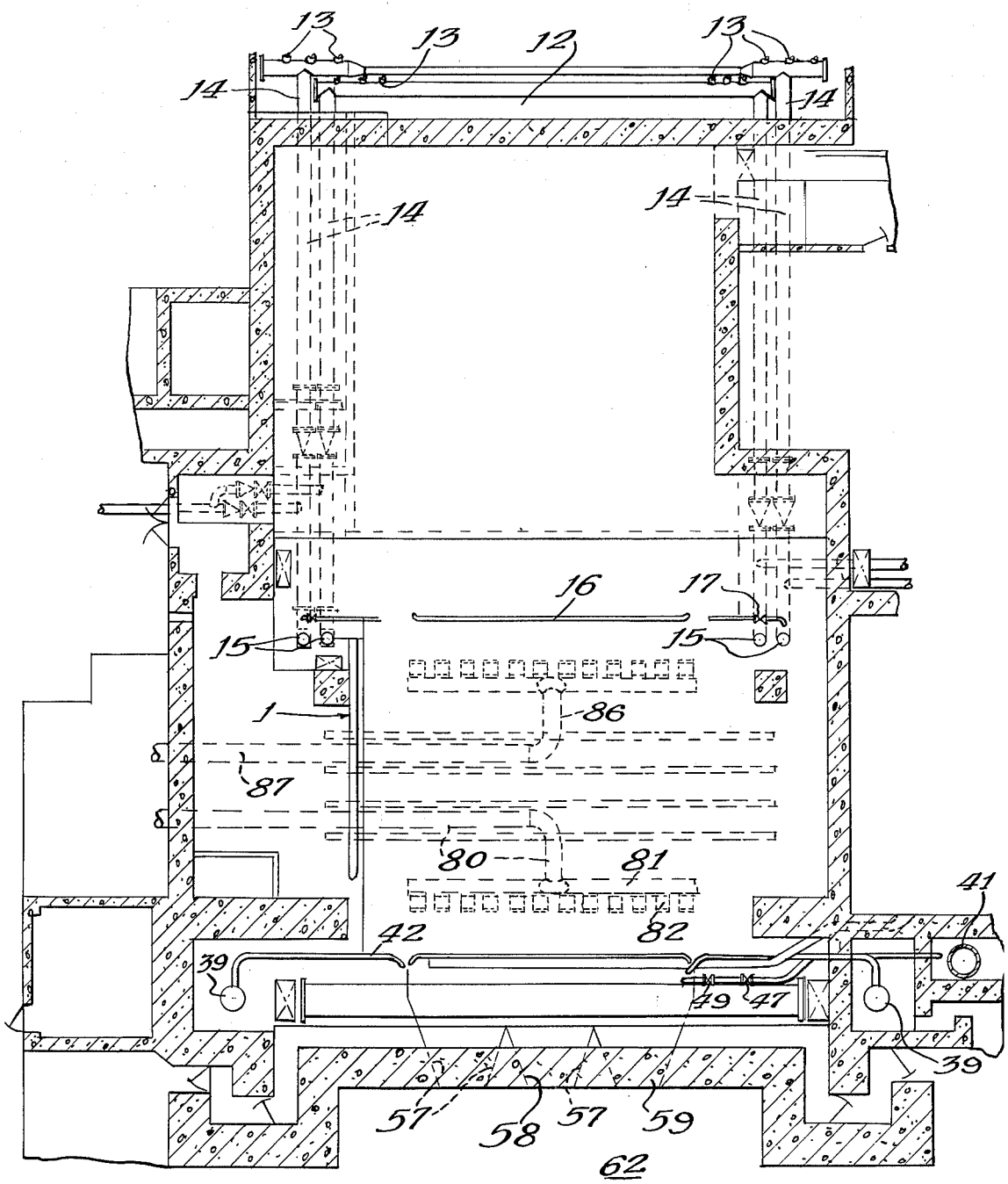
FIG. 5 is a ground plan view of the reactor, partly in section, illustrating the coolant circulating system, the helium circulating system, and a portion of the slug discharge, storage and transfer areas.

Referring first to FIGS. 2 and 5, there is delivered to a suitable valve pit 12 at the rate of 30,000 gallons per minute filtered water which has been treated to remove any foreign matter which could appreciably corrode or coat the aluminum tubes. The delivery pressure is 350 lbs per square inch and is obtained by two stage pumps units, the first stage being a steam driven pump raising the pressure to 120 pounds per square inch, the second and high stage being an electrically driven pump. Either stage is capable of supplying water to the reactor at 120 pounds per square inch pressure if the other stage fails. Instead of a single large pumping unit, 12 identical two stage units are provided, 10 units being used and two units being held in reserve. The final stage of each unit delivers its water to the valve pit 12 through an individual 12 inch water pipe 13, (FIG. 5) from which passes through pipes 14 into upright risers 15.

The risers 15 are arranged adjacent to the charging face of the reactor, two risers at each side of the charging face. Each of the risers at one side of the charging face is connected to a different riser at the opposite side of the charging face by a plurality of four inch diameter horizontal headers 16. Each header 16 extends across the charging face of the pile adjacent the inlet ends of two adjacent rows of coolant tube 7. The two sets of connected headers provide a greater factor of safety in event of failure in the piping, and also permit the use of refrigerated water, if desired, in part of the tubes nearer the center of the pile, and water at normal source temperature in the remainder of the tubes.

Interposed between the ends of each header and its associated risers are stopcocks 17 which control the flow of water to the particular header.

Figure 8:
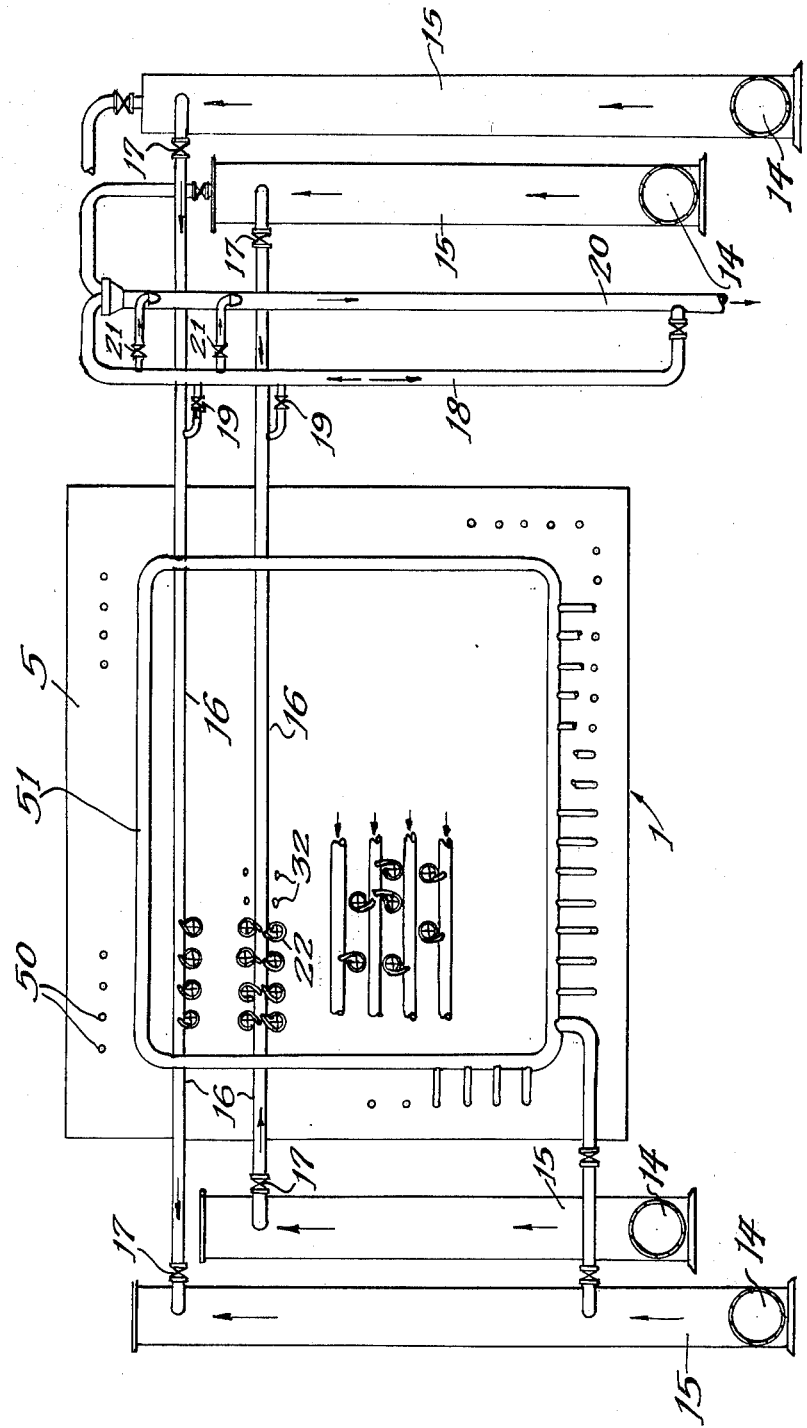
FIG. 8 is a diagrammatic front elevation of the charging face of the reactor illustrating the water circuit for the delivery of cooling water to the reactor.

As best illustrated in FIG. 8 a standpipe 18 is connected to the headers 16, a by-pass valve 19 being interposed between each header 16 and the standpipe 18. The standpipe 18, in turn, is connected to a drain 20 through a series of overflow valves 21 arranged one for each header 16. Each valve 21 is above the level of the corresponding valve 19 of the common header associated with the two so that, when a header is temporarily cut off from the cooling circuit, it remains full of water under a pressure head equal to the differential in height of the two valves 19 and 21. As will appear hereinafter, a head of back-pressure is maintained on the outlets of the tubes connected to the particular header. With this arrangement, each or any number of headers 16 can be cut off and drained or not, as desired, without affecting the others, and a dual source of supply of coolant with its advantages of safety is provided. Fourteen headers connect one pair of risers and 22 headers connect the other pair of risers.

Figure 12:
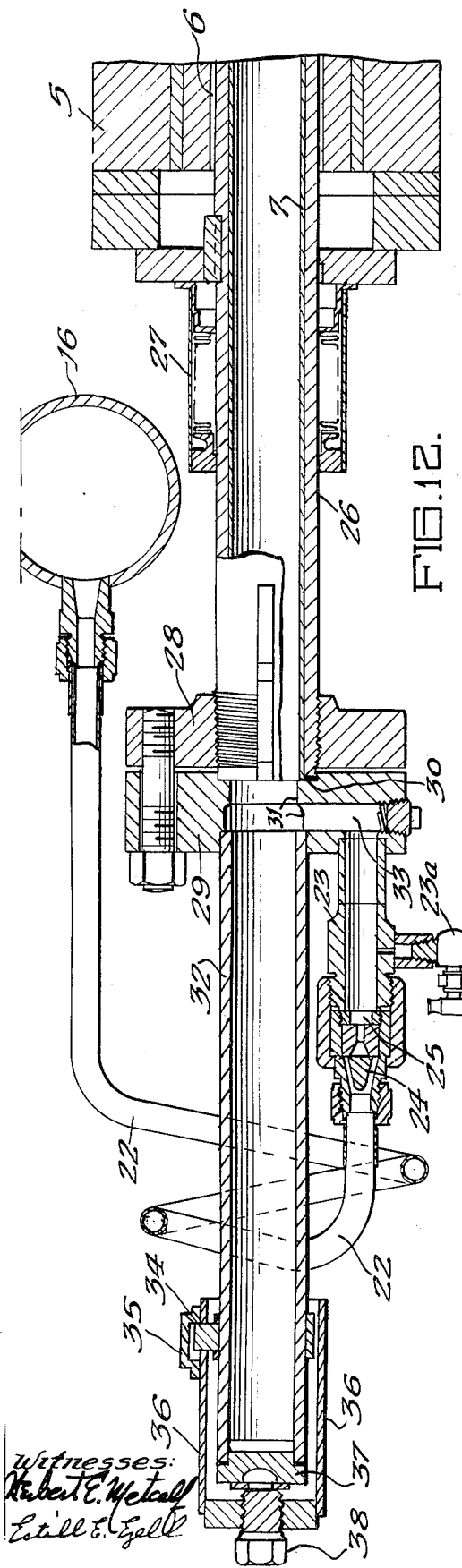
FIGS. 12 and 13 are enlarged fragmentary longitudinal vertical sectional views of the inlet end and discharge end, respectively, of one of the aluminum coolant tubes, and the inlet and outlet water fittings associated therewith.
Figure 13:
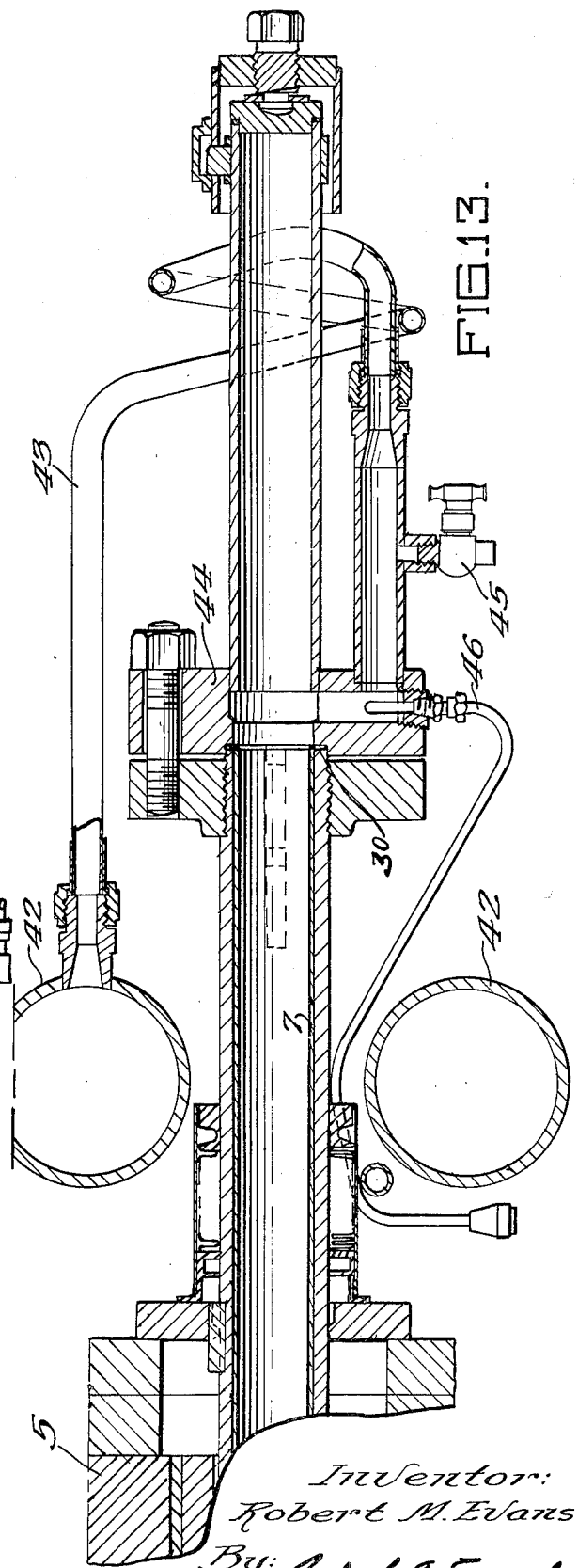

As mentioned, each header 16 serves two adjacent rows of tubes 7. Furthermore, each header 16 is connected to the tubes of its associated rows by individual flexible tubes 22, as best illustrated in FIGS. 8 and 12, each of which is coiled into a one turn helix coaxial with its associated tube for permitting ease of access to the end of the tube and for compensating for any expansion and contraction of tubes 7. In order to maintain the volume and pressure of the water supplied through each tube accurately at predetermined amounts, certain special inlet fittings are used.

Referring to FIG. 12, each flexible tube 22 is connected to a nozzle 23 which contains a strainer 24 and an accurate throttling and pressure reducing orifice disc 25. A suitable needle valve fitting 23a is connected to each nozzle 23 beyond the orifice in the direction of flow for connecting gauges for accurately monitoring and indicating the inlet pressure for each tube. The throttling orifice is preselected for each coolant tube, to meet the heat, flow resistance and pressure drop conditions of that particular tube. A thermocouple is inserted in nozzle 23 to monitor and indicate inlet water temperature.

Figure 10:
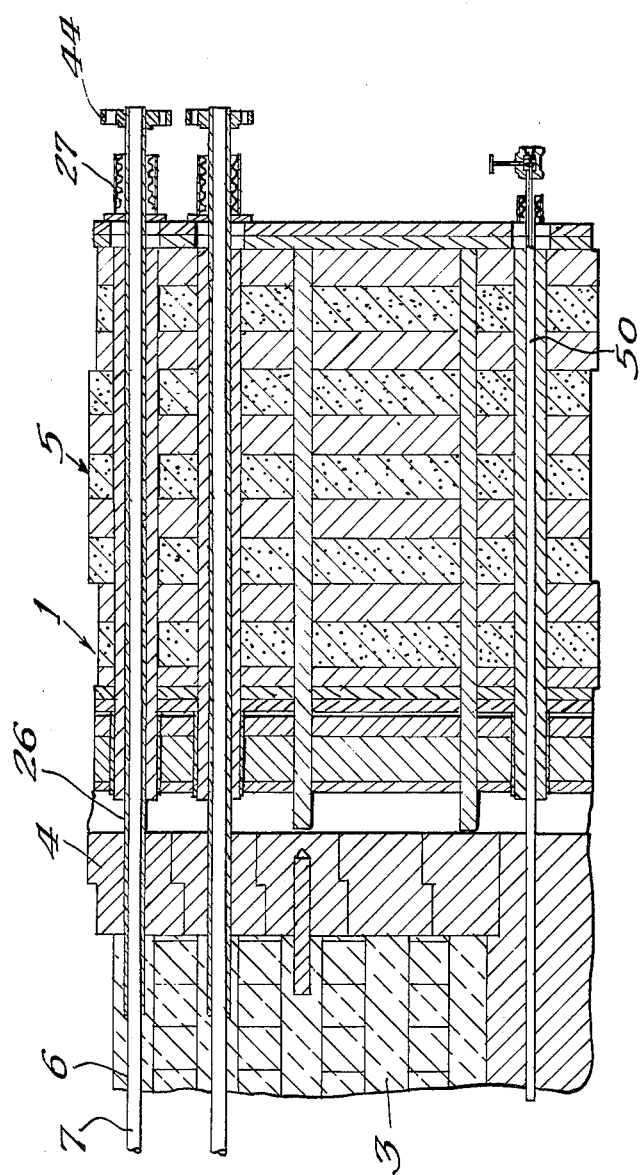
FIG. 10 is an enlarged fragmentary vertical longitudinal sectional view of the reactor showing one of the aluminum tubes thereof.

As mentioned, it is necessary that each tube 7 be accessible from the ends for charging and discharging, that a proper flow of coolant be maintained, and that provision be made for preventing escape of water into the shield and graphite of the pile. For these reasons, the end portions of each tube 7 are sealed in a tubular steel expansion sleeve 26 which extends through the thermal shield 4, biological shield 5 and a short distance into the reflector 3, as illustrated in FIGS. 10 and 12. A seal connection is provided between the sleeve 26 and biological shield at the outer face of the shield 5 by means of a metal bellows 27 to permit expansion and contraction of the tube 7. A flange 28 is secured to the end of the sleeve 26 and cooperates with a companion flange 29 to seal the end of the aluminum tube 7 tightly about its periphery, as indicated at 30. The flange 29 has an axial bore 31 which is coaxial with the aluminum tube 7 and forms a continuation of the passage through the tube 7.

Mounted in the flange 29 is a tube extension 32 which is in sealed engagement at its periphery at one end with the flange 29 and is coaxial with the bore 31. The tube extension 32 passes through the helix of the flexible coolant tube 22. The flange 29 has a radial bore 33 which communicates with the nozzle 23 and bore 31 for admitting coolant into the tubes which also may be used to receive a thermo couple, pressure gauge or other monitoring instrument, as desired. The outer end of each tube extension 32 carries a radial lug 34 which detachably engages in a suitable opening 35 on an end closure cap 36. A removable closure plug 37 is carried on a jack screw 38 mounted in the cap 36 coaxial with the tube extension 32 and is operated by the screw to seal on the end of the extension 32 for sealing the tube.

Cooling System at Discharge Face

The discharge of coolant from the reactor is subject to the same general conditions as exist at the inlet. Furthermore, allowance must be made for the discharge of treated slugs, removal of hot water from tubes which are being unloaded, and escape of air and gases from the cooling water.

Figure 9:
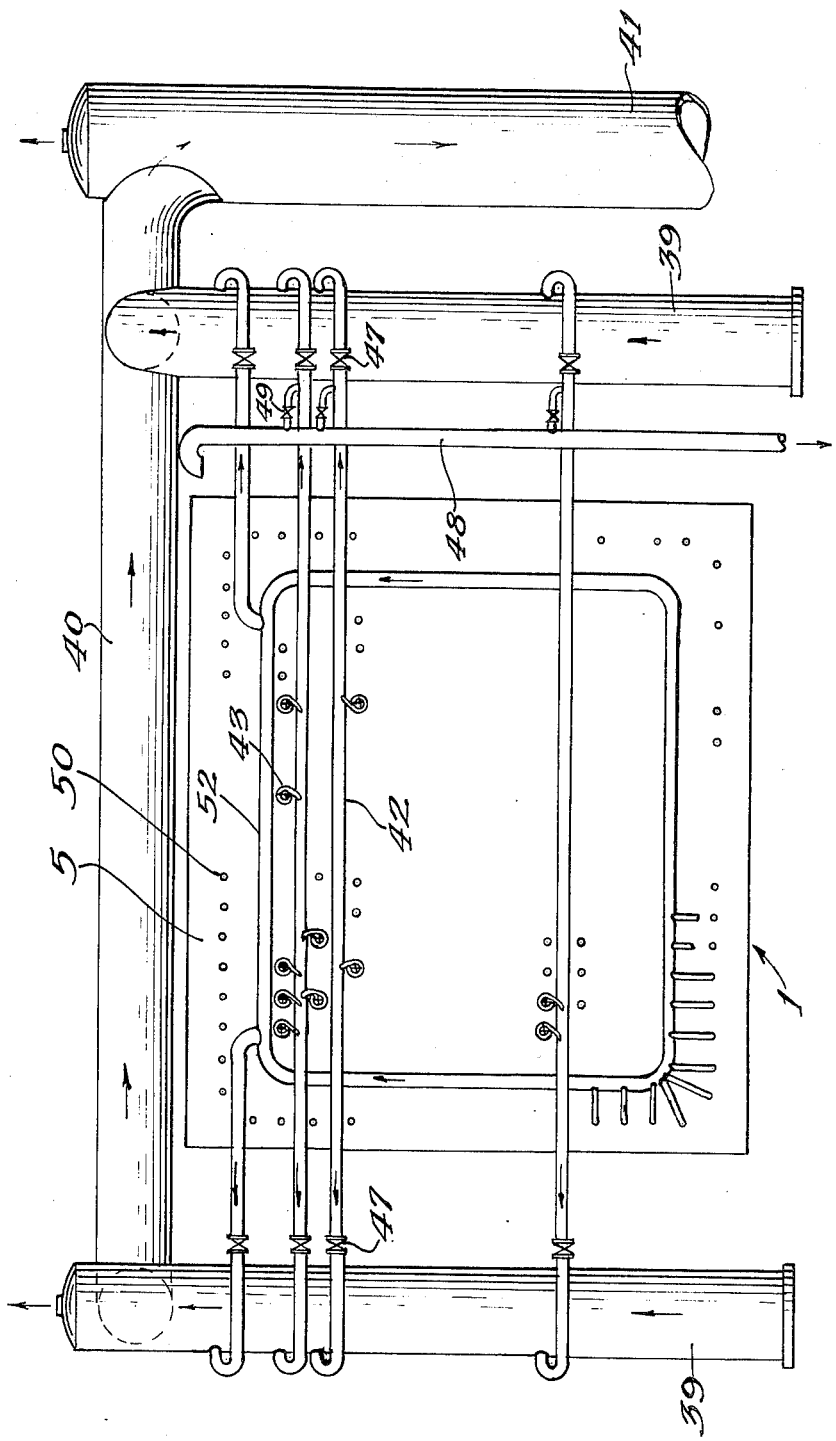
FIG. 9 is a diagrammatic rear elevation of the discharge face of the reactor illustrating the water circuit for the discharge of cooling water from the reactor.

For these purposes the arrangement at the discharge face of the reactor, as illustrated in FIG. 9 comprises a pair of upright discharge headers 39 which are arranged at opposite sides of the discharge face of the reactor and are connected at their upper ends by a common discharge header 40 to a downspout 41. The headers 39 are connected by a plurality of horizontal discharge manifolds 42, each of which is connected to two adjacent rows of tubes 7. The manifolds 42 are connected to their associated tubes 7 by means of flexible tubes 43, respectively, arranged one tube 43 to each tube 7. As is more fully disclosed in FIG. 13, the connections between the tubes 43 and discharge ends of the tubes 7 are the same in all respects as the connections between the tubes 22 and inlet ends of the tubes 7 except that the tubes 43 are connected with the tubes 7 through flanges 44 without the interposition of orifice disc 25 such as are in the nozzles 23. A needle valve fitting 45 and thermocouple tube 46 are provided for monitoring the pressure and temperature, respectively, of the coolant at the outlet end. For permitting drainage of hot water from a header 42 of any preselected row of tubes 7 without interfering with the headers 42 of any other row of tubes 7, stopcocks 47 are interposed between each end of each header 42 and the upright headers 39. Each header 42 is connected to a down drain 48 through by-pass valves 49. Both upright discharge headers 39 are closed at the bottom and the common connecting header 40 is above the level of the top row of tubes 7 so that, in event of failure of the water supply, a minimum head of water a few feet high will be maintained on all tubes and drainage of the tubes 7 prevented. The down drain 48 discharges into a drain pit and the downspout 41 discharges into a cushioning chamber and thence through a subterranean concrete duct into a retention basin. The retention basin, not shown, has a capacity of 11,200,000 gallons, thus providing a four hour decay period for the water in the basin before it is discharged to publicly accessible locations.

Each of the coolant tubes 7 is charged with about 36 slugs, 1.44 inches in diameter and 8 inches long, placed end to end in the tube within the moderator mass but not extending all the way to the end faces of the moderator. A reflecting layer of moderator is thus maintained beyond the extent of the slugs. The ends of the tube are filled with dummy slugs which may be of aluminum in the reflecting layers, and of lead or stainless steel in the thermal and biological shields. The dummy slugs are designed to obstruct the water flow as little as possible and still perform their function of reducing radiation escape along the tubes to the charging and discharging faces. During operation, approach to the charging face is safe, but the radioactivities induced in the water, residual salts and/or corrosion products in the exit water, make close approach to the discharge face and the discharge piping inadvisable while the reactor is operating.

As illustrated in FIGS. 8 and 9, stainless steel cooling tubes 50 extend through the thermal shield for the full length of the reactor at the sides, top and bottom. These tubes 50 and ⅜ of an inch in diameter and are spaced apart from each other about 8⅜ inches. In the illustrative reactor, 208 of these tubes are provided, each being supplied with 3.5 gallons of water per minute from a common inlet header 51 at the charging face of the pile. They discharge through a common header 52 at the discharge face of the reactor, the header 52, in turn, discharging into the upright header 39. With this system, adequate and safe cooling is possible.

It should be noted that a limitation exists on the amount of water which can be passed through each coolant tube 7 due to the fact that the rate of flow is proportional to the pressure drop across the 44 feet length of the tube. A sustained pressure in the tubes 7 of about 200 pounds per sq. inch is the maximum permissible, if slow expansion of the coolant tube is to be avoided. When the inlet water pressure is limited to 200 lbs/sq. inch, the exit pressure is about 18 lbs/sq. inch. The water flows through the annulus between the slugs and the tube at a velocity of about 20 ft/sec. This corresponds to a flow rate of about 23 gal/min.

To avoid harmful corrosion of the tubes 7 and of the aluminum jackets at the slugs 9, the exit temperature of the water preferably should not exceed 65°C. Corrosion of the tubes 7 is objectionable because it eventually could cause leaks which would permit water to enter the graphite. Corrosion of the slug jackets could permit leakage of highly radioactive fission products into the water stream, and, more important, could cause expansion of the slugs and reduction of the coolant flow through the tubes 7. This, in turn, may lead to the serious "boiling" effect heretofore mentioned and its hazardous consequences, later to be discussed in detail.

As mentioned, the delivery pressure of the water is 350 lbs/sq. inch and the inlet pressure in the tubes 7 is about 200 lbs./sq. inch maximum.

It is very important that the pressure of 350 lbs/sq. inch be maintained on the headers 16, the 200 lb/sq. inch reduced pressure in the tubes 7 being obtained by the orifices in throttling discs 25, thus maintaining a pressure drop across the orifices of about 150 lbs/sq. inch. The effect of this drop will be later described.

Figure 6:
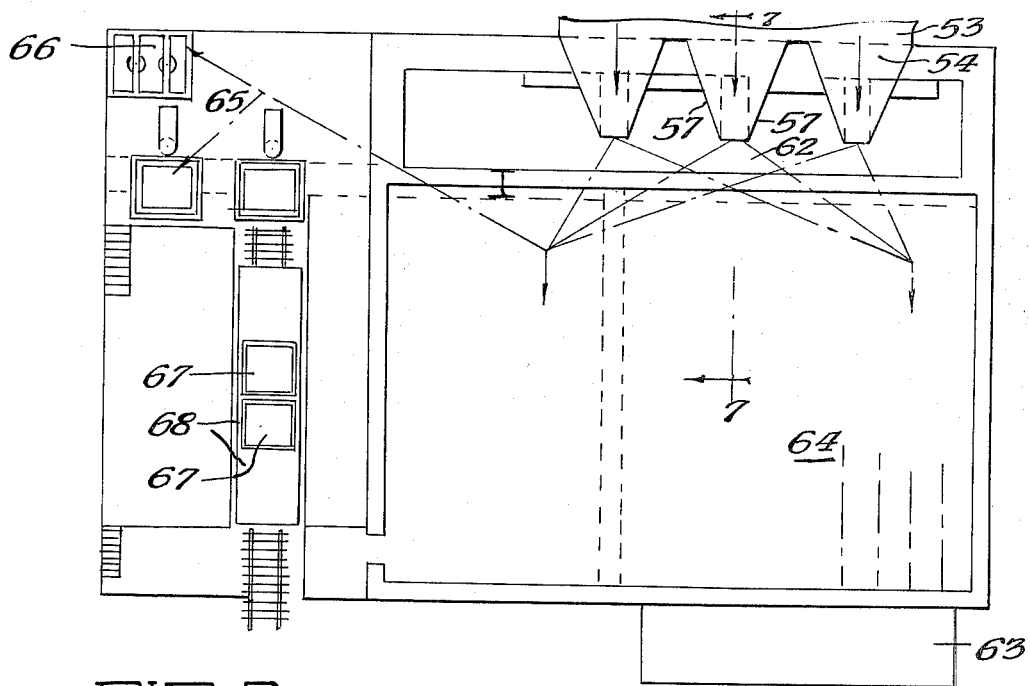
FIG. 6 is a top plane view of the discharging, sorting and transfer areas, a portion of the reactor being shown diagrammatically for purposes of illustration.
Figure 7:
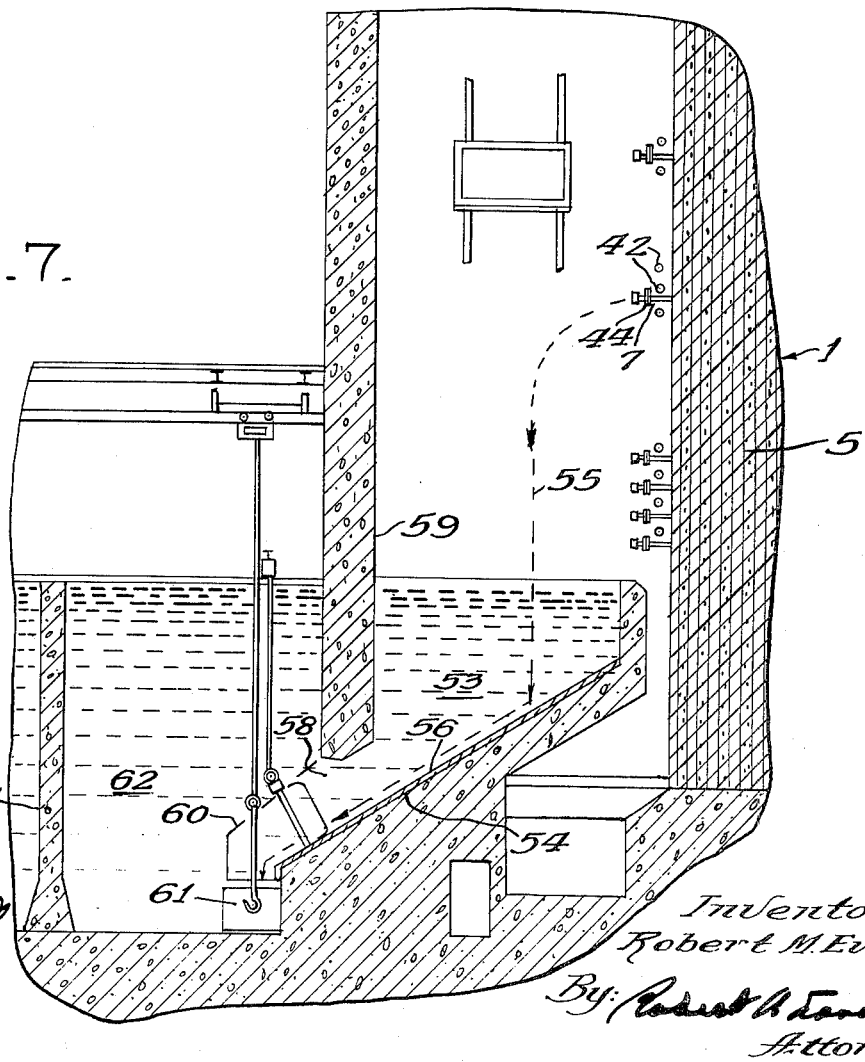
FIG. 7 is a fragmentary vertical sectional view of the discharge area taken on line 7—7 of FIG. 6.

Referring to FIGS. 6 and 7, provision must be made for discharge of the slugs and for the discharge of water from the tubes therewith. For this purpose, there is arranged beneath the outer ends of the tubes 7 at the discharge face of the pile 1, a discharge basin 53 having a bottom wall 54 which slopes downwardly away from the pile 1. The slugs from tubes 7 upon discharge, fall as indicated by the broken line 55, into the basin 53. The bottom wall 54 of the basin is covered with a neoprene cushion or pad 56 and is so positioned that its lower end is about eighteen feet below the level of the water in the basin. The basin 53 is provided with lateral guide walls 57 which converge rearwardly from the pile and terminate in chute openings 58 in the rear wall 59 of the discharge basin.

The water from tubes being discharged may fall into this basin 53, although at times a suitable trough (not shown) is hung on the row of pipes being discharged so as to catch the water and divert it to the downspout 41.

The slugs pass through the opening 58 and through a spout 60 which directs them into a bucket 61 in a collection and weighing basin 62. Overhead hoists raise the buckets to a weighing platform where they are weighed, the active slugs and dummy slugs being separated from each other in the collection basin 62 prior to weighing. As shown in FIG. 6, the dummy slugs are then carried by suitable hoists to a dummy storage basin 63 and the active slugs to a process metal basin 64 in which they are stored in the buckets. Later, the buckets are transferred to a transfer area 65 in which the slugs are dumped, sorted, and placed in heavily shielded casks 66 on each of which a cover is placed. The casks 66 are then hoisted and transferred to water tanks 67 on a special flat car 68 for transportation away from the reactor site, and for subsequent chemical treatment to recover the 94 formed therein.

All of these basins are filled at all times with water to a depth of 18 feet or more for cooling and for the protection of personnel from radiation emanating from the discharged slugs.

Control Rods and Shims

As mentioned hereinbefore, it is necessary to control accurately the operation of the reactor and one means of accomplishing this result is by the insertion into the graphite mass of control rods 69 containing neutron absorbing material such as boron.

Suitable control rods for this purpose are illustrated in FIGS. 1, 3, and 16, nine rods of the kind illustratively described being satisfactory for the present reactor. The control rods 69 are arranged in three vertically spaced tiers each of which comprises a set of three horizontally spaced rods. The rods 69 are arranged to be moved endwise in a horizontal plane and thus laterally through the graphite mass at right angles to the tubes 7 in aluminum lined channels, and are grouped to intersect the central portion of the mass. They are evenly distributed over a face area about 5 feet square. The neutron absorbing portion of each rod 69 preferably is of sufficient length to extend entirely across the mass. The rods are so positioned as to form a regular transverse grid in spaced relation to the tubes 7 and crossing the fore and aft grid formed by the tubes 7. Each rod 69 is composed of an aluminum beryllium alloy and is formed of a plurality of separate preformed and interfitting blocks, which when secured together accommodate an aluminum inlet pipe and a pair of outlet pipes for cooling. The neutron absorbing boron is flame sprayed on the aluminum pipes.

The rods 69 are movable selectively endwise into and out of the reactor 1 from one side by suitable driving mechanism 70, as illustrated in FIG. 16, which can be operated normally by an operator watching the various monitoring instruments. A "hot room" is provided at the control rod face of the reactor and is of a horizontal width equal to the length of the insertable portion of the rods 69 so as to accomodate the active portion of the rods after they have been exposed in the reactor and withdrawn. The openings in the shield of the pile for the rods 69 are closed by suitable hydraulically operated lead doors 71. The wall 72 separating the "hot room" from the room which houses the rod driving mechanism, also has rod passages 73 which can be closed by suitable lead doors 74. Extensions of the rods 69 pass through the openings 73 and cooperate with the driving mechanisms. Thus, personnel working around the driving mechanisms are not exposed to the active portions of the rods 69, and if any rod is removed, the shield passages and wall passages 73 may be closed to prevent radiation therethrough.

It is customary to use selected control rods as shims which are left in place in the reactor at adjusted positions wherein they impose a definite and safe upper limit on the reproduction factor of the reactor, the remaining rods being operated under manual control in accordance with changes in observed neutron density to maintain the neutron reproduction factor at unity during operation. Insertion of more rod material in the reactor reduces the reproduction factor and shuts down the reactor. Removal of more rod material from the reactor permits the reproduction factor to increase above unity and permits a rise in neutron density to a desired power. Those rods used as shims are also connected to be driven into the reactor automatically in case of emergency.

Safety Rods

In order to shut down the reactor in event of an emergency, safety rods are provided, and are arranged to be inserted quickly into the reactor. Since such rods are for emergency purposes, it is desirable that they be operable in as simple a manner as possible and not subject to possible failures of mechanical operating equipment. The most effective manner of operating the safety rods for shutting down the reactor is by gravity.

Figure 4:
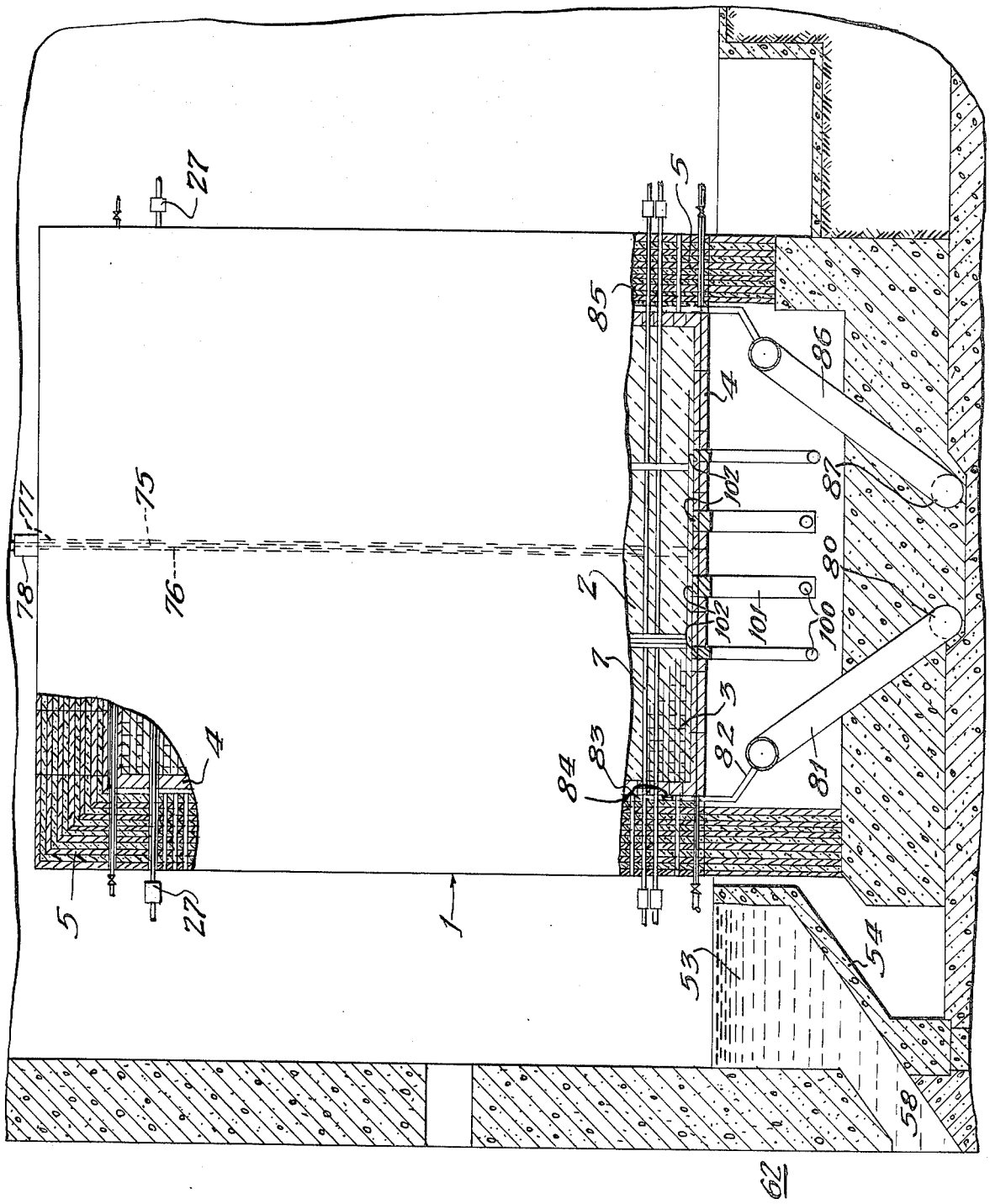
FIG. 4 is a vertical longitudinal sectional view of the reactor, showing part of the associated charging, discharging and handling equipment, taken on the plane 4—4 of FIG. 1.

In the present reactor 29 safety rods 75, as shown in FIGS. 1, 3, and 4, composed of 1½ per cent boron steel and of a diameter of 2¼ inches are utilized and are received in aluminum lined vertical passages 76, as is more fully disclosed in FIG. 4. The rods 75 are about 35 feet long and extend substantially from the top to the bottom of the graphite mass when they are fully inserted.

In order to remove the rods 75 and suspend them in position to be dropped by gravity into the passages, cables are attached to the rods and wound on overhead drums (not shown) driven by suitable electric or fluid motors. Each passage 76 preferably is lined with an aluminum tube, the entrance being defined by a suitable header 77. A limit switch (not shown) for controlling the fully raised position of each rod 75 is provided, as also is a bellows shock absorber 78. The rods are latched in the out position and are released as required by any abnormal operating conditions.

Helium Circulation System

Figure 14:
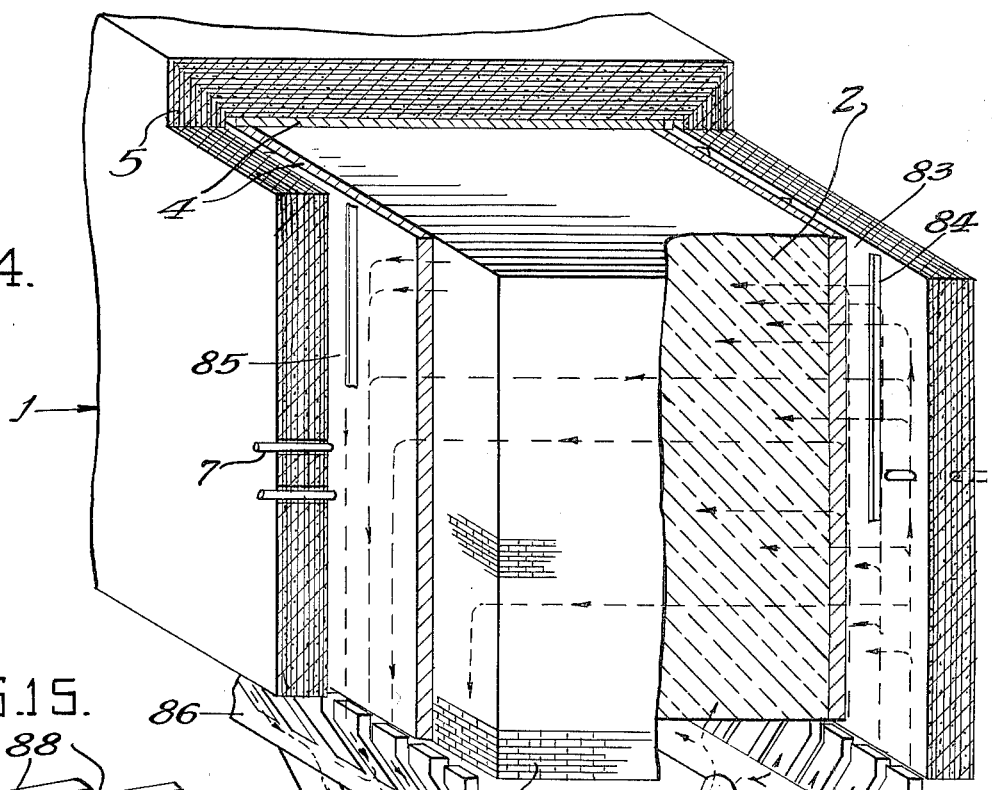
FIG. 14 is a diagrammatic perspective view of the reactor and the helium circulating system thereof.

Helium is continuously circulated through the reactor at a nominal rate of 1800 cu. ft./min., measured at 0°C and atmospheric pressure. The circulation system is shown diagrammatically in FIGS. 14 and 15. The pressure rise across the supply blowers is about 5 inches of water. The system operates between a maximum pressure of about 8 inches of water and a minimum pressure of 1 inch of water. The pressure existing at any particular point in the main circulating stream can vary over a range of 3 inches of water.

Helium enters the reactor area through a 24-inch horizontal duct 80, located about 15 feet below the thermal shield blocks at the base of the reactor. This duct makes one turn beneath the pile and discharges the center of a 24-inch header 81 located near and parallel to the charging face of the pile. The gas flows from the header 81 upwards through the ducts 82 and into the bottom of 4-inch wide spaces 83 separated by vertical partitions 84 which are left between the thermal and biological shields at the charging face of the reactor. The helium then works its way through the cracks between the thermal shield blocks, after which it streams through the channels provided in the graphite structure in a direction co-current with the water. It then flows through gaps between the thermal shield blocks at the discharge face of the reactor and discharges into a 4-inch space 85 left between the thermal and biological shields at the discharge end of the reactor. From this space the helium enters a discharge header 86 and leaves the reactor through another 24-inch diameter duct 87.

Figure 15:
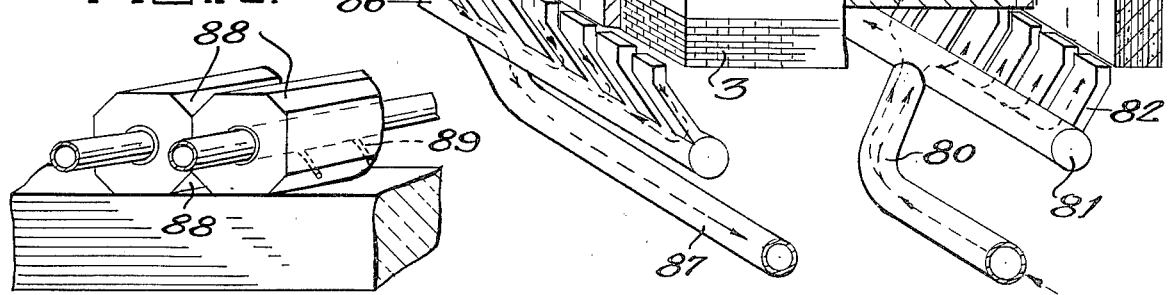
FIG. 15 is an enlarged fragmentary perspective view illustrating the helium circulation ducts in the moderator mass of the reactor.

The graphite blocks which contain the coolant tubes are laid with their long axis coaxial with the tubes. These blocks have a 0.39-inch chamfer 88 cut at each of the four corners along the long axis as shown in FIG. 15. Blocks not containing cooling tubes are laid with their long axis horizontal and perpendicular to the tubes. These blocks are not chamfered. The chamfers of the parallel blocks provide a large number of triangular shaped channels which extend through the entire graphite structure. The average helium velocity through these channels is about 5 ft./sec. when the pressure drop through the graphite and through the thermal shields is maintained at about 1 inch of water.

The temperature of the helium entering the reactor is determined very largely by the temperature of the surroundings near the inlet ducts. The helium leaving the reactor is at a temperature about 15°C higher than the average temperature of the discharged water. The heat removal by helium under normal conditions amounts to only about 50 kilowatts, or 0.02 per cent of the total heat generated in the reactor.

The presence of a leak in a cooling tube is indicated by a high moisture content of the discharged helium. The 4-inch space between the thermal and the biological shields at the discharge end of the pile is divided by partitions into ten vertical zones through which the helium flows downwards to the discharge duct. The helium in these zones can be tested for moisture, thus assisting in the location of a leaky tube, if present. To improve the efficiency of detection, each graphite block which carries a cooling tube has a number of ¼-inch weep holes 89 (FIG. 15) drilled from the various chamfered surfaces of the block to the tube passage in the block. These weep holes facilitate rapid diffusion of water vapor from any point of leakage to the channels which carry the helium.

Neutron Density Monitoring of Reactor

As illustrated in FIGS. 3 and 4, tunnels 100 are provided passing horizontally underneath the reactor between work spaces at each side of the structure. Adjacent the center of the base of the reactor, pipes 101 extend upwardly from the tunnels, and terminate adjacent the graphite mass, being blocked by lead plugs 102 at the level of the thermal shield. Lead has little effect on fast neutrons, but does reduce gamma radiation, so that during operation of the reactor fast neutrons reach the tunnels. To determine the neutron flux in the tunnels, cyclindrical ionization chambers 103 of the boron type are moved into the tunnels into positions where they are directly beneath the pipes 101, by means of cables 104 which extend through the tunnels 100 and which are reeled on complementary wall winches 105 at opposite sides of the reactor, only the right side winch 105 being shown. The winches 105 are located above the level of tunnels 100 and are shielded therefrom, and from the work spaces at their ends. Normally the ends of tunnels 100 are closed by removable shields 106. For high power monitoring pipes 101 may be diaphragmed just above the tunnels, and filled to a greater or lesser extent with water, to reduce the neutron density reaching the ion chambers.

The ionization chambers 103 are twelve in number, of which seven are used and five are in position as spares. Several of the ionization chambers 103 are connected to galvanometers within view of the reactor operator. By extrapolation of chamber readings in accordance with power output, as read by the difference between water input and output temperatures, the ionization chamber outputs can be calibrated in terms of power output, and the galvanometer readings are used by the operator for control of the reactor. Other ionization chambers are used to actuate safety circuits in case of an unexpected rise in neutron density.

In the operation of a neutronic reactor there are a number of conditions encountered that change the K factor of the reactive composition and which require corrective control rod manipulation. Certain changes in K are believed to be due to the formation of reaction by-products in the reactor, either radioactive or stable. As the production of both radioactive and stable reaction products is function of rate or irradiation of the uranium, the effect of these by-products on neutron reproduction becomes most important in reactors operating at high neutron densities.

Several relatively long term changes in K may be expected. Isotope $94^{239}$ is known to produce, on the average, a fraction more neutrons per fission than $U^{235}$. Consequently, as $U^{235}$ is used up by fission, and $U^{238}$ is converted into 94$^{239}$, the K constant may be expected to rise. To offset this rise in K there is an accumulation of long lived or stable fission products in the uranium that are the ends of fission fragment decay chains.

In reactors operating at high neutron densities such as in the reactor described herein, however, radioactive elements of exceedingly high capture cross section may be formed relatively quickly in the uranium as in intermediate element in the decay chains of the fission fragments and this formation can change K during operation. One of the most important of these decay chains is believed to be the 135 fission chain starting with Te (short) → I (6.6 hr) → Xe (9.4 hr) → Cs (20–30 yr) → barium, the parenthetical times indicating half lives. The neutron absorption of tellurium, iodine, caesium and barium is relatively unimportant, but the neutron capture cross section of radioactive xenon$^{135}$ has been measured to be about 2.5 million x $10^{-24}$cm.$^2$. Upon absorption of a neutron, xenon$^{135}$ shifts to xenon$^{136}$ an element of relatively small capture cross section. The change in K corresponds in period, to the xenon$^{135}$ appearance, and decay.

The rate of production of the Te is a function of the neutron density in which the uranium is immersed, and therefore dependent upon the power at which reactors of given type are operated. The radioactive xenon$^{135}$ is produced with a noticeable effect on the reaction a few hours after the reaction is started and the effect is, of course, greater as the neutron density is increased and maintained. The xenon$^{135}$ effect in high reactors can be summarized as follows.

The reaction is started by withdrawing the control rod. The neutron density rises at a rate determined by the reproduction ratio and the effect of the delayed neutrons, until predetermined neutron density is attained. The control rod is then placed in the unity reproduction ratio position and the reaction is stabilized at the power desired. During this time radioactive iodine is formed, decaying to xenon$^{135}$. As more and more iodine decays, more and more xenon$^{135}$ is formed, this xenon$^{135}$ absorbing sufficient neutrons to reduce the reproduction ratio below unity. This absorption also converts the xenon to xenon$^{136}$ which has no excessive capture cross-section. The neutron density drops. If no compensation were made by the rod for this drop, the density might drop until background conditions prevailed, and then the reaction might automatically start up as the xenon$^{135}$ decayed. Normally the neutron density drop is compensated for by removal of the shim rod to a new position where the reproduction ratio is again above unity. A neutron density rise occurs, bringing the density back to its former level. Again, more xenon$^{135}$ is formed and the process is repeated until an equilibrium condition is reached where the xenon$^{135}$ formed is transmuted by neutron absorption and by decay into isotopes of lower capture cross section (and by decay), as fast as it is being formed. In the meantime, the control rod (or equivalent) has to be withdrawn by an amount removing from the reactor neutron absorbers at least equal in effect to the absorption caused by the xenon$^{135}$.

It should also be pointed out that this xenon$^{135}$ effect will be present when shifting from a power where the effect is stabilized, to a higher power. The shift can be made and the reaction stabilized at the new power for a time, because the iodine formed from the new fissions has not had time to produce a significant amount of additional xenon$^{135}$. As the new xenon$^{135}$ is formed from the decay of the newly formed iodine, the reproduction ratio will again drop and must again be increased by withdrawal of absorbers from the reactor.

However, the reduction in K due to the xenon$^{135}$ equilibrium amount present when the neutron density is theoretically infinity in the reactor, is believed to be about 0.03. This means that to obtain a rise in neutron density to any desired density up to infinity, the rod would have to be eventually removed by an amount corresponding to an increase in the reproduction ratio of about 0.03, and somewhat less than 0.03 when finite densities are to be obtained. In accordacne with the density desired, the size of the reactor would have to be big enough to provide the increase. For example, in the reactor herein described, the reproduction ratio decrease due to xenon$^{135}$ at equilibrium is somewhat less than 0.020 at 250,000 kilowatts. As before stated, reactors ordinarily are not built sufficiently large in size to provide maximum reproduction ratios of over 1.01 even with all rods removed. However, if power outputs over 100,000 kilowatts are desired, the reactor must have its critical and operating sizes calculated using a final K constant decreased by the xenon$^{135}$ factor for the power desired even though the amount of reproduction is over 0.01. In other words a significant impurity is added during operation at high powers.

This leads to the requirement for a reactor of such size that, if it did not acquire xenon$^{135}$ during operation, could attain a maximum reproduction ratio of over 1.01 with all rods removed, and which, before a substantial amount of the iodine produced from fission decayed into xenon$^{135}$, could in consequence attain a dangerous neutron density if all rods were removed.

Such a reactor is adequately safeguarded by the use of the "shim" or limiting rods, inserted in the reactor preferably to depths that will not permit a reproduction ratio of about 1.01 to be attained at any time during the operation of the reactor, even when the control rod is completely removed. Then, if a reproduction ratio of more than unity cannot be attained by outward movement of the control rod alone, due to the build-up of the xenon$^{135}$ effect, the shim rod is withdrawn to compensate for the xenon$^{135}$ effect, but still be left in a position where the reproduction ratio cannot exceed 1.01, when the control rod is completely removed.

It can thus be seen that compensation for the xenon$^{135}$ effect is obtained, first by considering the xenon$^{135}$ impurity factor for the power desired as a reduction in K, to determine a proper operating size for a desired power, and second, by initially providing in the reactors impurities that can be removed by amounts compensating for the xenon$^{135}$ equilibrium amount acquired at a given power output.

Care must be taken, when shutting down a high power reactor operating with a xenon$^{135}$ equilibrium, that sufficient neutron absorbers are inserted to prevent automatic start-up of the reaction after the xenon$^{135}$ has decayed to the point where it does not materially affect the operation of the system. As a practical matter, shutdown should include the full insertion of all control, shim and safety rods into the reactor. As the build-up and decay of the xenon effect is gradual, no difficulty has been encountered in handling high power reactors to compensate for this effect.

Rod Operation for Emergency Shutdown

In case of an emergency, it is desirable to shut down the reaction as soon as possible. Several conditions exist where it is desirable to run all possible rods including the safety rods quickly into the reactor as follows:
1. High or low pressure at the downstream side of any coolant tube orifice.
2. Excessively high neutron density as signalled from ion chambers.
3. Failure of electrical power.
4. Manually when desired.

The first three conditions can readily be made to operate automatically by safety circuit connections from the appropriate indicators to the rod operating and latching mechanisms.

However, the reaction is not instantly stopped, when the emergency signal is given, because, first, it takes a finite time to insert the rods, and second, the delayed neutrons are active for a few seconds after the main reaction stops. Before proceeding to outline the safety precautions taken, a brief discussion of the effect of the delayed neutrons on the reaction is in order.

There is substantial time factor in the rise of neutron density after a reproduction ratio of unity has been exceeded due to the fact that a substantial portion, generally about one per cent, of neutrons generated in a neutronic reactor are "delayed neutrons". These delayed fast neutrons may appear at any time up to several minutes after the fission has occurred. Half these neutrons are emitted within 6 seconds and 0.9 within 45 seconds. The mean time of delayed emission is about 5 seconds. The cycle of neutrons from the time they are produced by fission within a reactor until they become absorbed is completed by 99 per cent of the neutrons in about 0.0015 seconds but if the reproduction ratio of the reactor is near unity, the extra 1 per cent may make all the difference between an increase or a decrease in the activity. The fact that the last neutron in the cycle is held back, as it were, imparts a slowness of response to the reactor that would not be present if the 100n neutrons were all emitted instantaneously.

For cases in which the reproduction ratio ($r$) differs from unity by (appreciably) less than 1 per cent, the rise of neutron density, or more specifically the value N to which the number of neutrons has risen from an original value $N_o$, after a lapse of time of $t$ seconds during and before which the pile has operated at a fixed value of $r$ ($N_o$ being the number of neutrons at the beginning of $t$, i.e., after disappearance of transient effects due to any preceding change in $r$), is given by —

$$N = N_o e^{wt}$$

where $$w = \frac{r-1}{\alpha - (r-1)} \cdot \frac{1}{T}$$

In this formula $\alpha$ is the fraction of the neutrons that are delayed, i.e., $\alpha=0.0067$, and $T$ is the mean time of delayed emission of the delayed neutrons (5 seconds). The above formula is only approximate because it uses an average delay time.

As an example, if $r$ is 1.001, and the system has settled down to a steady exponential rise in neutron density, then $$w = \frac{.001}{.0067 - .001} \cdot \frac{1}{5} = \frac{1}{28.5},$$

that is, $N/N_o = 2.75$ in 28.5 seconds. Hence, doubling of the neutron density occurs about every 20 seconds. The above formula thus indicates the rate of rise for relatively low values of $r$ and shows how the reduction of the rate of the delayed neutron effect is particularly significant in the stated lower range of $r$ values. Strictly speaking, the given equation holds only for the steady state, i.e., where $r$ has been held constant for some time; and additional transient term must be included to obtain an accurate representation of the neutron density during the first few seconds after a sudden change of $r$.

If $r$ were to be exactly 1.01, a more detailed theory shows that the neutron density would be more than tripled per second. However, if the reproduction ratio $r$ is several per cent greater than unity, so that the 1 per cent delayed neutrons are unimportant compared with $r-1$, the density increases at a much more rapid rate as given approximately by $r^{t/l}$ where $l$ is 0.0015 seconds, the normal time to complete a cycle. If $r$ were 1.02 and 1.03, the factor by which the neutron density would be multiplied per second would be 1100 and 700,000 respectively. If $r$ were to be made 1.04, the neutron density would increase in 1.5 seconds by a factor of approximately $10^{17}$ over its original level.

It is thus apparent that the operating conditions must always be such that the neutron reproduction ratio does not materially exceed 1.01 as the rate of rise of neutron density could then be so fast as to be uncontrollable, and preferably should not exceed from 1.002 to 1.005.

With the effect of the delayed neutrons on the reaction given above in mind, the means and method of preventing boiling forming the specific object of the present invention will next be discussed.

First, if the water be driven entirely from all the coolant tubes by steam formation, during operation of the reactor, the overall neutron reproduction ratio would increase from 1.000 to about 1.025, thereby increasing the reaction at such a tremendous rate that the reactor would literally explode, because an excess reproduction ratio of 0.025 would permit the neutron density to double more than 1100 times per second starting from an operating neutron density equivalent to a 250,000 kilowatt output. However, it is not probable that any complete drainage of water from all the coolant tubes could take place, and it will be noted that in the reactor presently described, even a complete cessation of water flow would still keep all tubes full of water, due to inlet and outlet header design. As standby water is always available, including a final gravity supply sufficient for several hours operation, the possibility of any large number of tubes becoming dry during the critical shutdown period is exceedingly remote.

It is possible, however, for one slug in a tube to swell due to coolant leakage through the aluminum jacket to the uranium, for, while all precautions are taken to prevent leaky seals, a leak may occur during operation. When this happens, and water reaches the uranium, the uranium corrodes, and as the corrosion products are less dense than the uranium, the jacket may swell and obstruct the water annulus. If not checked, such a swelling could close the coolant tube sufficiently to cause steam to form in the tube around a part of a slug, a whole slug, or several slugs. The increased temperature of 100°C or more then existing could rapidly accelerate corrosion both of the jacket and the uranium, and the tube obstruction might increase rapidly until the water around one or more slugs is replaced by steam, thus causing a local K factor increase. Under these conditions the local reproduction ratio could rise exceedingly rapidly, causing the temperature of neighboring slugs in the same or other tubes to rise, and in an extreme case to form steam in tubes adjacent the swelled slug. This new steam formation could bare or dry these neighboring slugs, and they could join in contributing to the neutron density rise, and the disease could rapidly spread outwardly from the focus if unchecked, until the entire reactor was involved, with disastrous consequences. The same situation could occur if any orifice became plugged, thereby preventing water flow over the slugs in the associated tube. Such a tube will be treated herein as an obstructed tube.

The safety rods guard against a catastrophe, as they can be dropped into the reactor in 2 to 2½ seconds after an emergency signal is given, such as, for example, a change in pressure on the tube inlet side of orifice, or a high outlet temperature in any tube. The safety rods contain sufficient neutron absorbers to reduce the neutron reproduction ratio by 0.038, a sufficient amount to normally shut down the reactor even if several of the rods should fail to fall. Furthermore, the safety and other rods absorb sufficient neutrons to shut down and hold inactive even a completely dry reactor.

The remaining problem, then, is to protect the reactor against an abnormal neutron density rise during the short time it takes the rods to enter the reactor, together with the time thereafter the delayed neutrons play a part in continuing the reaction, as an abnormal rise would be certain to cause damage to all tubes in which steam was formed.

To prevent a boiling focus from spreading, the excess header pressure of 150 pounds per square inch is available at each tube orifice. This excess pressure instantly and automatically operates to prevent back pressure from completely stopping water flow within shutdown time, and the effect of the excess pressure is useable, not only in the obstructed tube, but also, and this is most important, in the neighboring tubes.

First, considering an obstructed tube, it may be possible, and it is the most probable situation, for at least a small water circulation to be maintained past the obstruction so that more water is supplied than can be turned to steam by the partially exposed slugs downstream from the obstruction. The excess water aids in sweeping out the steam from the tube through the outlet. It is also possible, but less probable, that a sudden swelling of a slug can so block the tube that little if any water can flow past the obstruction. Such an obstruction also takes place when an orifice is completely blocked. In this case, the slugs first boil the water, with the steam passing out through the outlet. When bare, or dry, the slugs set up a localized focus of neutron supply at a high rate of increase while the neutron density in the rest of the reactor is falling, during the shutdown initiated by the pressure change at the inlet of the obstructed tube. If then, steam formation in adjacent tubes can be prevented from baring the slugs in these neighboring tubes, the neutron density rise which is due to the few exposed slugs in the obstructed tube can be tolerated during the shutdown period, as their possible contribution to the total neutron density of the reactor is minor rather than major. A central tube generates about 360 kilowatts at operating power. As the neighboring tubes are unobstructed and the time required for shutdown is short, the excess 150 lbs/sq. in. pressure close to the inlet of all the tubes will operate to sweep out any generated steam from around the slugs in these adjacent tubes, and thus prevent the local K rise from spreading. Thus, an important effect of the excess pressure takes place in the neighboring unobstructed tubes.

In order to insure that the desired excess pressure is available in the exceedingly remote circumstance where a pump power failure might exactly coincide with a shutdown due to tube obstruction, the final stage electrical pressure pumps for the header water are provided with flywheels, which will supply at least 75% of the original flow rate for a period of 20 seconds after such power failure, thus still maintaining an excess pressure in the headers after power failure. This period is also used to shift over to the first stage steam pumps so that at all times, at least until several seconds after shutdown, excess pressure is available in the headers. Once the reaction is shut down, a small flow serves to cool the reactor using a 50 lb. header pressure from the steam pumps or from overhead tanks.

It should be noted that the desired excess pressure is available for all individual coolant tubes, that it is available close to the inlet end of the coolant tube and that the coolant tube outlet pressure is low.

The above means and method has eliminated the possibility of the "boiling disease" occurring in a neutronic reactor operating at high power within the range of normal operating risks, and several reactors incorporating the safety features described and claimed herein have been operated at 250,000 kilowatts power output for extended periods without incident.

The delayed neutrons are, of course, emitted after the rods have stopped the reaction, that is, they will be emitted after the safety rods arrive in place in the reactor. They prolong somewhat the shutdown period but as they are present only at about 1% of the total, they can maintain the reaction after shutdown only at a maximum of 1% of the operating power, and the power then decays as their emission decays. In consequence, as far as the delayed neutrons are concerned, they are not an important factor in the presently discussed problem except that they do delay complete shutdown beyond the safety rod arrival time in the reactor.

Even after the chain reaction itself has essentially stopped, the uranium continues to liberate energy in the form of gamma and beta radiation. Because the energy of these radiations is transformed into heat, cooling of the reactor is required after shutdown. Twenty minutes after complete shutdown, heating continues at 1.6% of the rate at which it was generated during actual operation, and two days after shutdown the rate is still 0.5% of the operating rate. To meet this situation, the average water pressure in the headers is held at about 50 lbs./sq.in., providing a 75% reduction in flow rate.

What is claimed is:
1. A neutronic reactor having a moderator, coolant tubes traversing the moderator from an inlet end to an outlet end, bodies of material fissionable by neutrons of thermal energy disposed within the coolant tubes, and means for circulating water through said coolant tubes characterized by the improved construction wherein the coolant tubes are constructed of aluminum having an outer diameter of 1.729 inches and a wall thickness of 0.059 inch, and the means for circulating a liquid coolant through the tubes includes a source of water at a pressure of approximately 350 pounds per square inch connected to the inlet end of the tubes, and said construction including a pressure reducing orifice disposed at the inlet ends of the tubes reducing the pressure of the water by approximately 150 pounds per square inch.

* * * * *